United States Patent [19]

Tam

[11] Patent Number: 5,216,752
[45] Date of Patent: Jun. 1, 1993

[54] INTERSPIKE INTERVAL DECODING NEURAL NETWORK

[75] Inventor: David C. Tam, Houston, Tex.

[73] Assignee: Baylor College of Medicine, Houston, Tex.

[21] Appl. No.: 630,463

[22] Filed: Dec. 19, 1990

[51] Int. Cl.$^5$ ............................................. G05B 15/18
[52] U.S. Cl. .................................................. 395/27
[58] Field of Search ......................................... 395/27

[56] References Cited

PUBLICATIONS

Asynchronous VLSI Neural Network Using Pulse-Stream Arithmetic; Murray et al.; IEEE J. of Solid-State Circuits; vol. 23, No. 3; Jun. 1988; pp. 688-697.
A model for temporal correlation of biological neuronal spike trains; Tam et al.; IJCNN; Jun. 18-22, 1989; vol. 1.
Tam, David C., "Decoding of Firing Intervals in a Temporal-Coded Spike Train Using a Topographically Mapped Neural Network," Proceedings of the International Joint Conference of Neural Networks (1990) III:627-632.
Tam, David C., "Temporal-Spatial Coding Transformation: Conversion of Frequency-Code to Place-Code Via a Time-Delayed Neural Network," Proceedings of the International Joint Conference of Neural Networks (1990) I:130-134.

*Primary Examiner*—Allen R. MacDonald
*Attorney, Agent, or Firm*—Fulbright & Jaworski

[57] ABSTRACT

A multi-layered neural network is disclosed that converts an incoming temporally coded spike train into a spatially distributed topographical map from which interspike-interval and bandwidth information may be extracted. This neural network may be used to decode multiplexed pulse-coded signals embedded serially in an incoming spike train into parallel distributed topographically mapped channels. A signal processing and code conversion algorithm not requiring learning is provided.

2 Claims, 4 Drawing Sheets

INTERSPIKE INTERVAL DECODING NEURAL NETWORK

This invention was made with Government funds; the Government has certain rights in the invention.

BACKGROUND OF THE INVENTION

1. Field of the Invention

This invention relates to multi-layered time-delayed neural networks useful in a variety of data and signal processing, image recognition and other computational tasks. In particular, the present invention relates to a means to convert serially encoded temporal firing intervals of a spike train waveform into a spatially distributed topographical matrix in which the interspike-interval and bandwidth information of the spike train may be extracted.

2. Description of the Related Technology

Topographical maps of neurons are found in the central nervous system of biological organisms for the tonotopical representation of tones, somatotopical representation of body surface, retinotopical representation of the visual world, etc. These topographical maps represent information based on the spatial locations of the neurons. The signals encoded by the biological neurons have characteristic pulse height and pulse width, and may be considered as pulse-coded signals where the information is encoded in the time of occurrence of the pulses.

This time-series of pulses is called a spike train and the neuron information is contained in the interspike-intervals between pulse firings from the neurons. Thus, the signal information transmitted by a neuron can be considered as "temporally-coded" by the time intervals between pulses in the spike train. Various methods of correlation analysis of spike trains in biological neurons have been developed. See for example "Neuronal spike trains and stochastic point process", Perkel, Gerstein and Moore, Biophys J., Vol. 7, pp. 391-440 (1967); "Cross-interval histogram and cross-interspike interval histogram correlation analysis of simultaneously recorded multiple spike train data", Tam, Ebner and Knox, *Journal of Neuroscience Methods*, Vol. 23, pp. 23-33 (1988).

Given this serial transmission of the temporally-coded interspike pulse train, the information contained within the spike intervals may be decoded into parallel topographically distributed codes. Topographical distribution of codes based on the location of the neurons is called "place-code". By converting temporally-coded signals into topographically distributed codes, the firing intervals of neurons may be readily recognized as a particular neuron in a population ensemble. Thus, individual firing patterns may be distinguished such as burst-firing from long-interval firing and periodic firing from non-periodic firing.

Neural networks are characterized by a high degree of parallelism between numerous interconnected simple processors. The neural network nomenclature is derived from the similarity of such networks to biological neural networks. See for example "Computing with Neural Circuits A Model", Hopfield and Tank, Vol. 233, pp. 622-33.

In general, neural networks are formed or modeled using a number of simple processors or neurons arranged in a highly interconnected pattern wherein each of the neurons performs the simple task of updating its output state based upon the value of signals presented to it as inputs. The design of a neural network involves determining the number, arrangement and weight of the interconnections between neurons. The weight of a connection corresponds to the biological synaptic strength and determines the degree in which the output signal on one neuron will effect the other neurons to which it is connected. Thus, each neuron or processor receives input signals which are derived from the output or activation states of other connected neurons.

These activation states or output signals are linearly, typically resistively, operated on via the connection weights and then summed. Summation may be accomplished in an analog circuit which adds together all input voltages to give a resultant voltage representative of the sum of the inputs. This input signal summation is then operated on by a non-linear processor function, such as a threshold detector, to produce an updated output activation state.

SUMMARY OF THE INVENTION

Information contained within the firing intervals of a temporally coded spike train may be decoded by a multi-layered neural network having some of its inputs delayed in time. This serially coded information can be converted into a spatially distributed two dimensional topographical map with multiple output channels each having decoded information serially presented for further processing. The system and method of this invention is well suited to perform the decoding, classifying and characterizing of the interspike-interval information and bandwidth of a serially encoded spike train.

An object of the present invention is to decode multiplexed pulse-coded signals embedded serially in an incoming spike train into parallel distributed topographically mapped individual channels.

Another object of the present invention is to extract the time variances of the incoming interspike intervals by distributing these variances on a two-dimensional output neuron array.

Yet another object of the present invention is to characterize the underlying stochastic processes of the incoming spike train firing intervals.

The foregoing objects are achieved as is now described. The system and method of this invention implements a signal processing scheme for code conversion using time delayed input and specifically connected neural networks for computing the interspike interval and bandwidth information embedded in a serial temporal spike train without requiring a learning mode.

The system and method of this invention processes a received input spike train comprised of a series of pulses having a spike time interval wherein the time value of the interval contains the information of interest. This spike train input is applied to an undelayed input of each of a plurality of first-layer neurons and first-parallel-layer neurons. The undelayed input of each of the first neurons are effectively in parallel and receive the undelayed spike train input simultaneously.

The input spike train is also applied to a delay means that time shifts the input spike train so as to produce multiple cascaded replicas of the spike train delayed by multiples of incremental time intervals ("$k\Delta t$"). For example, $\Delta t$ may be equal to one (1) millisecond ("msec") and k may represent values from 1 to n. Thus, time shifted replicas of the input spike train will begin 1 msec, 2 msec, 3 msec, 4 msec, . . . , and n msec after the original spike train. These time delayed versions of the spike train are systematically applied to inputs of the first-layer and first-parallel-layer neurons. $\Delta t$ may be any time value so long as the spike interval time is greater than $\Delta t$.

Each first-layer and first-parallel-layer neurons are assigned a position in a network of the system of this invention. Each first neuron has a total number of inputs dependent on its position in the network. For example, the 1st neuron in the first layer has two inputs: one undelayed input connected directly to the spike train, and the other input connected to an output of the delay means whereby the spike train is delayed by $\Delta t$. The 2nd neuron has three inputs receiving the input spike train and cascaded time delayed replicas thereof: input (1) is undelayed, (2) is delayed by $\Delta t$ and (3) is delayed by $2\Delta t$. Similarly, the 3rd neuron has four inputs, the 4th neuron has five inputs, ... and the nth neuron has $n+1$ inputs.

Both the first-layer and first-parallel-layer neurons may be thought of as a linear cascade of neurons having a progressively increasing number of inputs wherein these inputs receive successively increasing time delayed replicas of the input spike train. The purpose of both the first-layer and first-parallel-layer neurons are to indicate when there is a time coincidence of spikes at the inputs of each first neuron. Spike time coincidences at two or more inputs of the first-layer neurons produces an output. Similarly, spike time coincidences at three or more inputs of the first-parallel-layer neurons produces an output.

A first neuron may determine spike time and delayed spike time coincidence at its inputs by adding together all of the input signal voltages. Adding together the input voltages produces an internal voltage in the neuron representative of the sum of these input voltages. This internal summation voltage can be compared to a threshold voltage so as to perform a predefined logical operation.

For illustrative purposes assume that each first neuron input spike has a voltage amplitude value of one volt and the first-layer neurons have a threshold voltage of greater than one volt. Whenever two or more inputs have spike voltages coincident in time, the internal neuron voltage sum will be greater than one volt and an output is produced. Thus the first-layer neurons perform a logical operation representative of two or more input spike voltages being coincident in time.

The first-parallel-layer neurons have a threshold voltage of greater than two volts. Similarly, when three or more inputs have spike voltages coincident in time, the internal neuron voltage sum will be greater than two volts and an output is produced. Thus the first-parallel-layer neurons perform a logical operation representative of three or more input spike voltages being coincident in time.

A single neuron with two threshold values and two outputs may perform the same function as a first-layer and a first-parallel-layer neuron combined. In addition, the first-layer neurons inhibit their outputs after an input spike time coincidence causes an output to occur. This output inhibition is for a time period of $(k-1)\Delta t$ where $k=1$ to n. For example, the 3rd first-layer neuron will not produce another output for $(3-1)\Delta t$ or $2\Delta t$. Using the above example $2\Delta t$ would equal 2 msec. This inhibitory time is called the refractory period. This refractory period is used to inhibit neuron outputs that would normally occur given the input spike time coincidence criteria mentioned above. A purpose of this refractory period is to compensate for the effects of phase differences between the original spike train and its time delayed replicas applied to the other inputs of the first-layer neurons.

Normally, an interspike interval will fall within a time delay window less than or equal to $k\Delta t$. For example, where $k=4$ and $\Delta t=1$ msec the spike interval must be less than or equal to 4 msec for the 4th or greater number first-layer neuron to fire (voltage signal on output). However, a spike interval of 2 msec will also cause the 4th or greater number first-layer neuron to fire. Thus, the first-layer neurons detect and fire on the first and higher order interspike intervals.

The first-parallel-layer neurons detect and fire on the second and higher order interspike intervals because its voltage threshold requires three on more inputs have time coincident spikes. Therefore by subtracting the outputs of the corresponding position first-parallel-layer neurons from the outputs of the corresponding position first-layer neurons, only the first order interspike intervals will be detected.

This subtraction process is performed in a plurality of second-layer neurons which eliminate higher order interspike interval detection. The outputs of the first-layer and first-parallel-layer neurons are applied to the inputs of the corresponding position second-layer neurons. Each second-layer neuron has two inputs: one excitatory and the other inhibitory. The excitatory second-layer neuron input receives the corresponding position first-layer neuron output and the inhibitory second-layer neuron input receives the corresponding position first-parallel-layer neuron output. Thus, for example, the 3rd first-layer neuron and the 3rd first-parallel-layer neuron outputs are connected to the 3rd second-layer neuron excitatory and inhibitory inputs respectively.

An output from the second-layer neurons occur when a corresponding position first-layer neuron output is applied to the excitatory input of the corresponding position second-layer neuron and there is no corresponding position first-parallel-layer neuron output applied to the inhibitory input of the second-layer neuron. Thus, if a first-parallel-layer output occurs in time coincidence with its corresponding position first-layer neuron output, then the corresponding position second-layer neuron output is inhibited even though the excitatory input of the second-layer neuron receives an output from the corresponding position first-layer neuron. This is how only the first order interspike intervals are detected. Thus, an accurate representation of true first order intervals within the time delay window is assured.

An interspike interval may be thought of as the reciprocal of instantaneous frequency. The time delay window, $k\Delta t$, may also be thought of as a high-pass filter where the interspike interval must be less than or equal in time to this window. Thus, this window sets the lowest instantaneous frequency that can be detected. Therefore, longer interspike intervals may be detected as the number of first neuron inputs and time delays (k) are increased.

Given the various high-pass filtered interspike intervals possible, a plurality of band-pass filtered intervals may be obtained by connecting a plurality of third-layer neurons, configured in a two dimensional matrix, to the second-layer neuron outputs. In addition, the third-layer neuron matrix also characterizes the bandwidth variations of these interspike intervals.

The third-layer neuron two dimensional matrix may consist of n columns and m rows (n,m) where the number of third-layer neurons is equal to the product of n and m. Each third-layer neuron has two inputs: one excitatory and the other inhibitory. The (k,h) third-layer neuron's excitatory input receives the k-th second-layer neuron output and its inhibitory input receives the h-th second-layer neuron output for k=1 to n and h=1 to m where n>m. In similar fashion to a second-layer neuron, the output of a third-layer neuron only will fire when its excitatory input has a spike voltage and its inhibitory input has no spike voltage.

As an example, let k=6, h=4 and $\Delta t=1$ msec; thus, the longest detectable spike interval is 6 msec and the shortest detectable spike interval is 4 msec. Any spike interval greater than 6 msec. or less than 4 msec will not activate the output of the (6,4) third-layer neuron. Thus, any output from the (6,4) third-layer neuron will represent spike intervals from 4 to 6 msec with a bandwidth variance of 2 msec.

Arranging the third-layer neuron matrix so that interspike intervals are represented by a horizontal axis (h) and the bandwidth of the interspike interval variances are represented by the vertical axis (k) allows decoding of temporal codes to spatial codes and, in addition, may be used for the decoding of multiplexed signals. Since the received interval times and their bandwidth variances are readily discernible, each third-layer neuron output may be further processed as a discrete channel of specific information.

Uses for the third-layer neuron output information are in speech recognition, visual image recognition, etc. The system and method of this invention allows processing of complex neural type signal information similar to the type of nerve signal information found in animals and man. This invention has application, but is not limited to, image recognition of radar signals, video images, sonar signatures, speech patterns, and data compression and multiplexing as possibly used between the retinal and the central nervous system of a biological structure.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The system and method of the present invention provides a novel neural network architecture in combination with a signal delay means that represents an implementation of a signal processing scheme for code conversion using time for computing and coding that does not require learning. This invention may be used to decode multiplexed pulse coded signals embedded serially in an incoming spike train into parallelly distributed topographically mapped demultiplexed channels having unique information represented in each channel.

The system and method of this invention comprises three layers of neurons: (1) a first-layer and first-parallel-layer, (2) a second-layer and (3) a third-layer arranged in a two dimensional matrix form. In addition a time delay means is used to time shift an incoming spike train signal so as to produce multiple cascaded time delayed replicas of this spike train.

Figure 1:
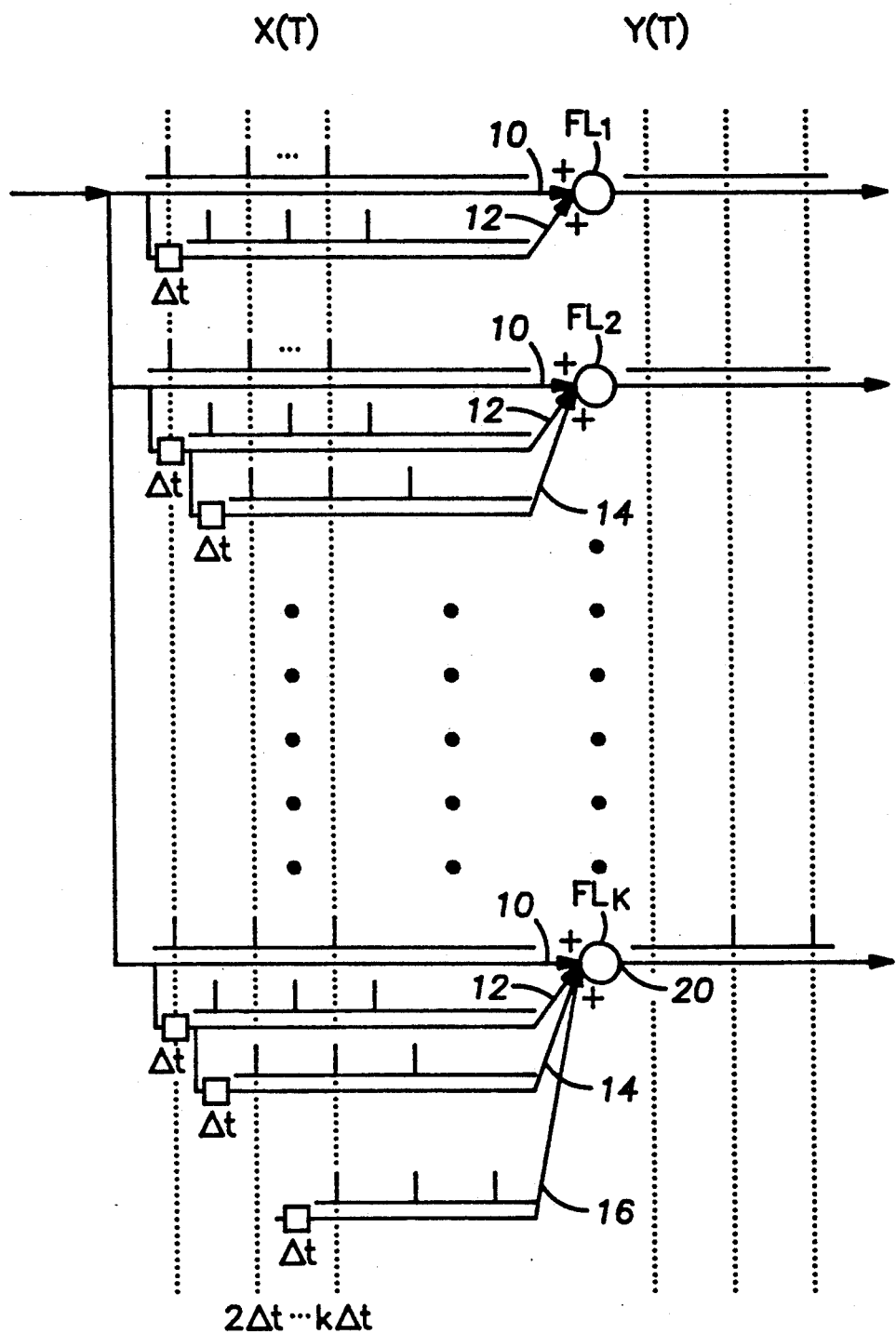
FIGS. 1 through 4 are schematic illustrations of the architecture of an interspike interval decoding neural network in accordance with the system and method of the present invention.

Referring now to the drawings, and particularly to FIG. 1, the letters FL designates generally a first-layer neural network with both direct and time delayed signal inputs receiving an incoming spike train representative of multiplexed coded information. Network FL includes a plurality of processing units $FL_1$, $FL_2$, $FL_3$, ..., $FL_k$. Each processing unit is designed to be suitable as a unit cell for integration in an analog VLSI integrated circuit. The function of each processing unit may also be simulated by software computer program means.

Generally, a spike train, x(t), may be defined as a time series of spikes (delta functions) with a total of n+1 spikes:

$$x(t) = \sum_{j=0}^{n} \delta(t - \tau_j)$$

Such that at time $t=\tau_j$, there is a spike occurring in the spike train given by the delta function, which satisfies:

$$\delta(t) = \begin{cases} 1, t = 0 \\ 0, t \neq 0 \end{cases}$$

The time between spikes is the interspike-interval, $I_j$, and may be defined as the time interval between any two adjacent spikes occurring at time $\tau_j$ and $\tau_{j-1}$, where:

$$I_j = \tau_j - \tau_{j-1}, \text{ for } 0 < j \leq n$$

Each processing unit, $FL_i$ where i=1 to k, has a first input 10 receiving the undelayed spike train signals and a second input 12 receiving a replica of the spike train delayed in time by $\Delta t$. As the processing unit number increases so does the number of its inputs receiving the progressively time delayed replicas of the spike train. For example, processing unit $FL_2$ also has a third input 14 receiving a replica of the spike train delayed in time by $2\Delta t$, thus unit $FL_k$ has k+1 inputs with a k-th input 16 receiving a replica of the spike train delayed in time by $k\Delta t$.

Therefore, as illustrated in FIG. 1, the k-th neuron processing unit, $FL_k$, in the first layer has k+1 inputs, each input receiving a progressively time delayed replica of the spike train signal. Therefore, the input spike train is delayed by times given by $\tau = i\Delta t$, for i=0 to k.

A feature of the system and method of this invention is the bandpass filtering of the interspike intervals by the first-layer neuron processors. If the sum of the inputs to the k-th first-layer neuron processor is defined as:

$$X_k(t) = \sum_{i=0}^{k} x(t - i\Delta t)$$

and the interspike interval of the original undelayed spike train falls within the time delay window, $I_j \leq k\Delta t$, for $0 < j \leq n$, then the input sum may defined as:

$$X_k(t) = \sum_{i=0}^{k} x(t - i\Delta t) > 1$$

Conversely, if $I_j > k\Delta t$, for $0 < j \leq n$, then $X_k(t) < 1$. Thus, if the threshold for the input sum is set at greater than one, then the k-th neuron processor output will fire only when the interspike interval, $I_j$, of the input spike train is within the time delay window, $k\Delta t$. The output of the k-th first-layer neuron processor, $FL_k$, may be represented by:

$$y_k(t) = \begin{cases} 1, & \text{if } X_k > 1 \\ 0, & \text{otherwise} \end{cases}$$

Therefore, the k-th neuron first-layer processor may be considered to encode a bandpass filtered input interspike interval, $0 < I_j \leq k\Delta t$, wherein the k-th neuron output 20 will fire only if the original input spike train contains an interspike interval below this cutoff interval of $k\Delta t$.

In order to ensure that a first-layer neuron processor output will fire with a pulse of duration $\Delta t$ only, given the various phase differences of the incoming delayed replicas of the input spike train, a refractory period of $(k-1)\Delta t$ for the k-th neuron is used. The output of the k-th neuron is inhibited, even if the input criteria are met, during the refractory time period.

If more than two spikes occur within the time delay window, $\tau = k\Delta t$, then the first-layer neuron processor may be overestimating the cutoff interspike interval, in which case the interspike intervals are shorter than the cutoff interval, $k\Delta t$. To prevent the first-layer neurons from estimating higher order interspike intervals instead of the first order interspike intervals, another set of neurons parallel to this first-layer is added and connected in a similar fashion. These parallel neurons are called first-parallel-layer neurons and have their inputs connected in the same fashion as do the first-layer neuron inputs.

Figure 2:
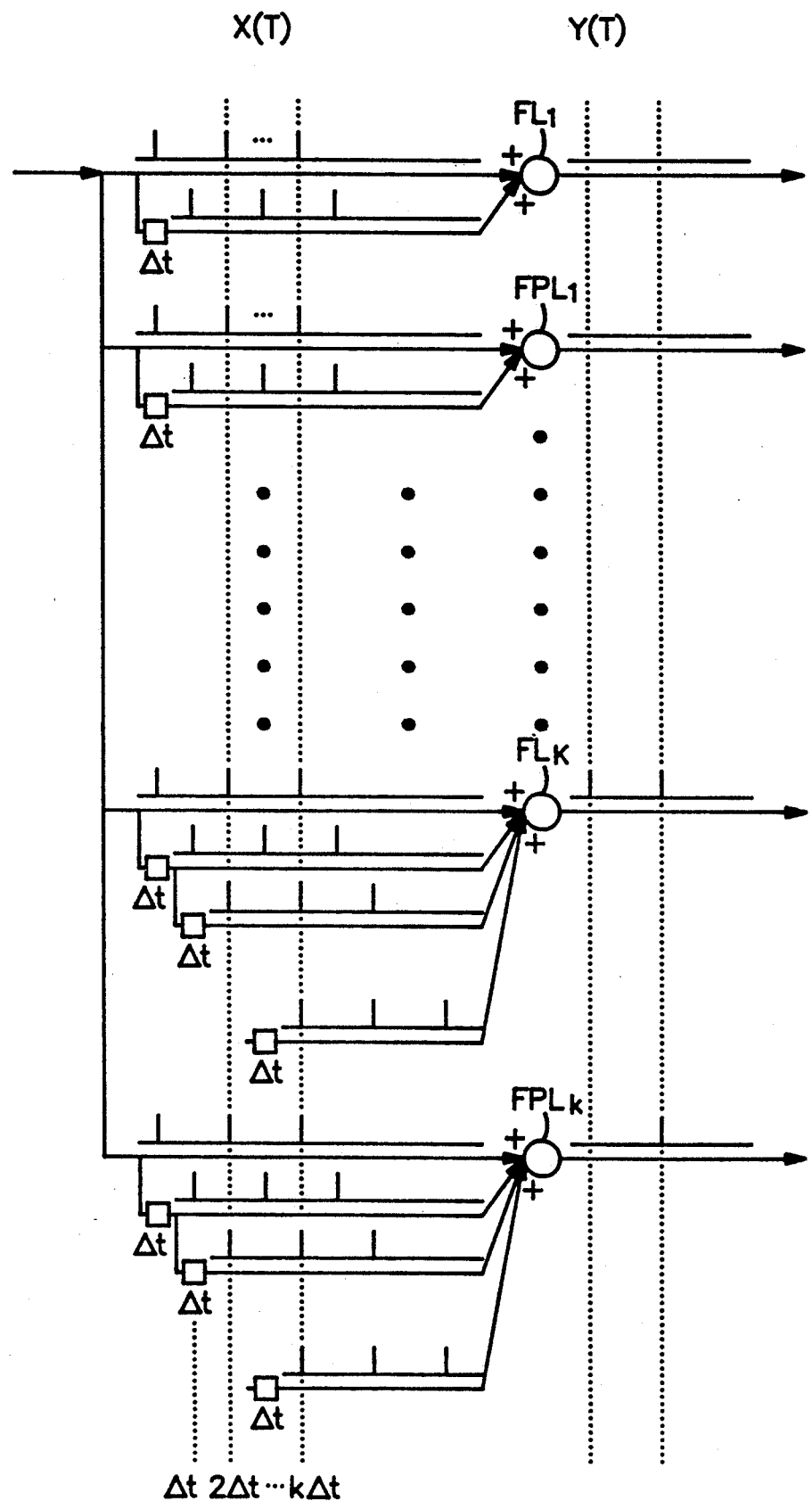

Referring now to FIG. 2, first-parallel-layer neuron processors, $FPL_i$ where $i = 1$ to $k$, function in the same way as do the first-layer neuron processors except that the input summation threshold is set at greater than two instead of greater than one. The output of the k-th first-parallel-layer neuron processor, $FPL_k$, may be represented by:

$$y'_k(t) = \begin{cases} 1, & \text{if } X_k > 2 \\ 0, & \text{otherwise} \end{cases}$$

Since the first-layer neuron processors detect first and higher order interspike intervals and the first-parallel-layer neuron processors detect second and higher order interspike intervals, taking the difference between these two sets of neuron processors results in the detection of only the first order interspike intervals. The system and method of this invention obtains the difference between the first-layer and first-parallel-layer neuron outputs using second-layer neuron processors connected to the respectively positioned first neuron processor outputs.

Figure 3:
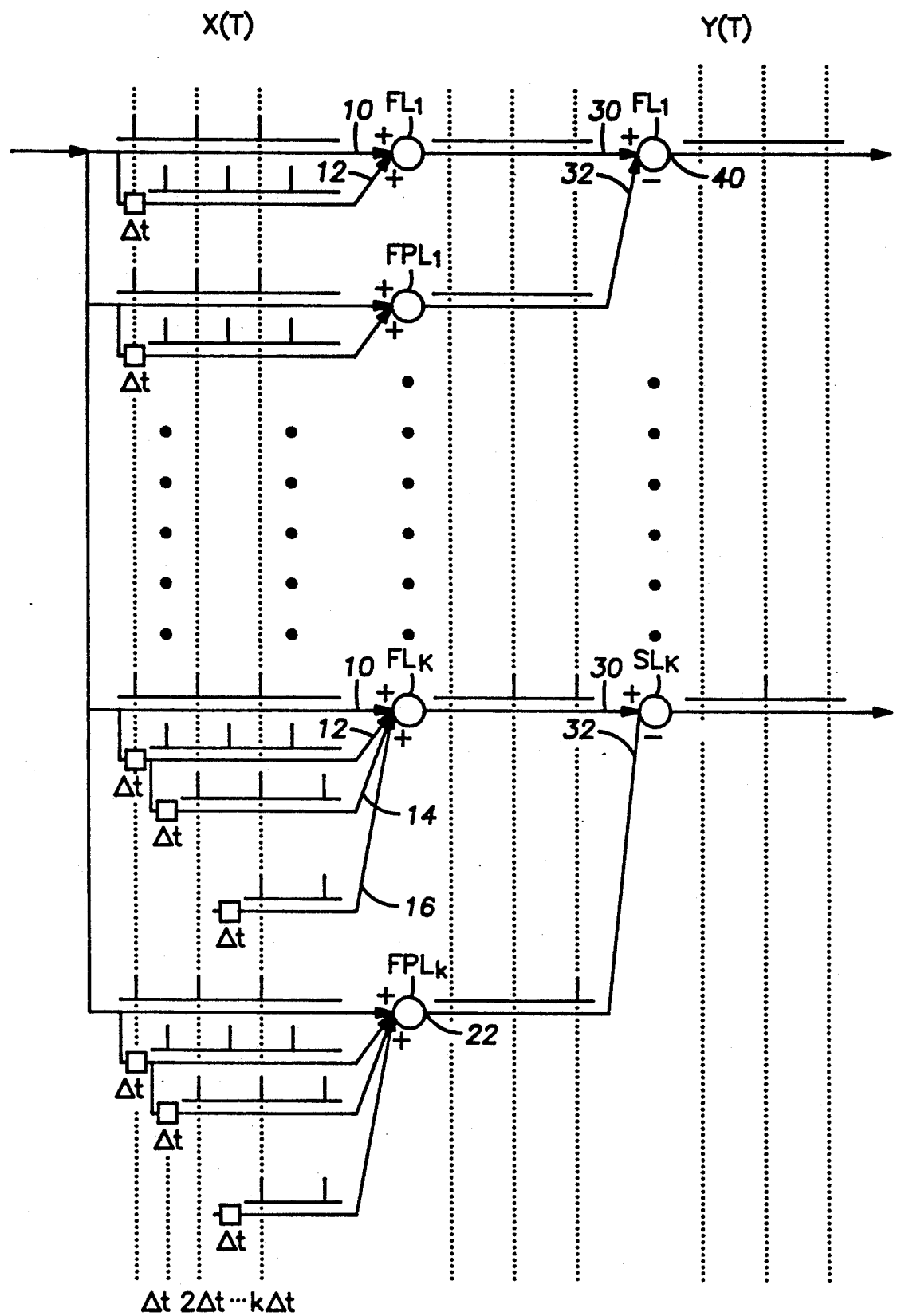

Referring now to FIG. 3, second-layer neuron processors, $SL_i$ where $i = 1$ to $k$, each have an excitatory input 30 connected to the respective position first-layer neuron output 20 and an inhibitory input 32 connected to the respective position first-parallel-layer neuron output 22. The output of the k-th second-layer neuron processor, $SL_k$, may be represented by:

$$y''_k(t) = y_k(t) - y'_k(t) = \begin{cases} 1, & \text{if } 2 \geq X_k(t) > 1 \\ 0, & \text{if otherwise} \end{cases}$$

This ensures an accurate estimation of the first order interspike interval, $0 < I_j \leq k\Delta t$, within the time delay window $k\Delta t$.

Given that the k-th neuron processor output in the second-layer indicates the first order interspike intervals represented by $0 < I_j \leq k\Delta t$, and the h-th second-layer neuron processor output indicates the first order interspike intervals represented by $0 < I_j \leq h\Delta t$, then the difference between the k-th and h-th second-layer neuron processor outputs represents the first order interspike intervals with a bandwidth of $h\Delta t$, i.e., $(k-h)\Delta t < I_j \leq k\Delta t$.

Figure 4:
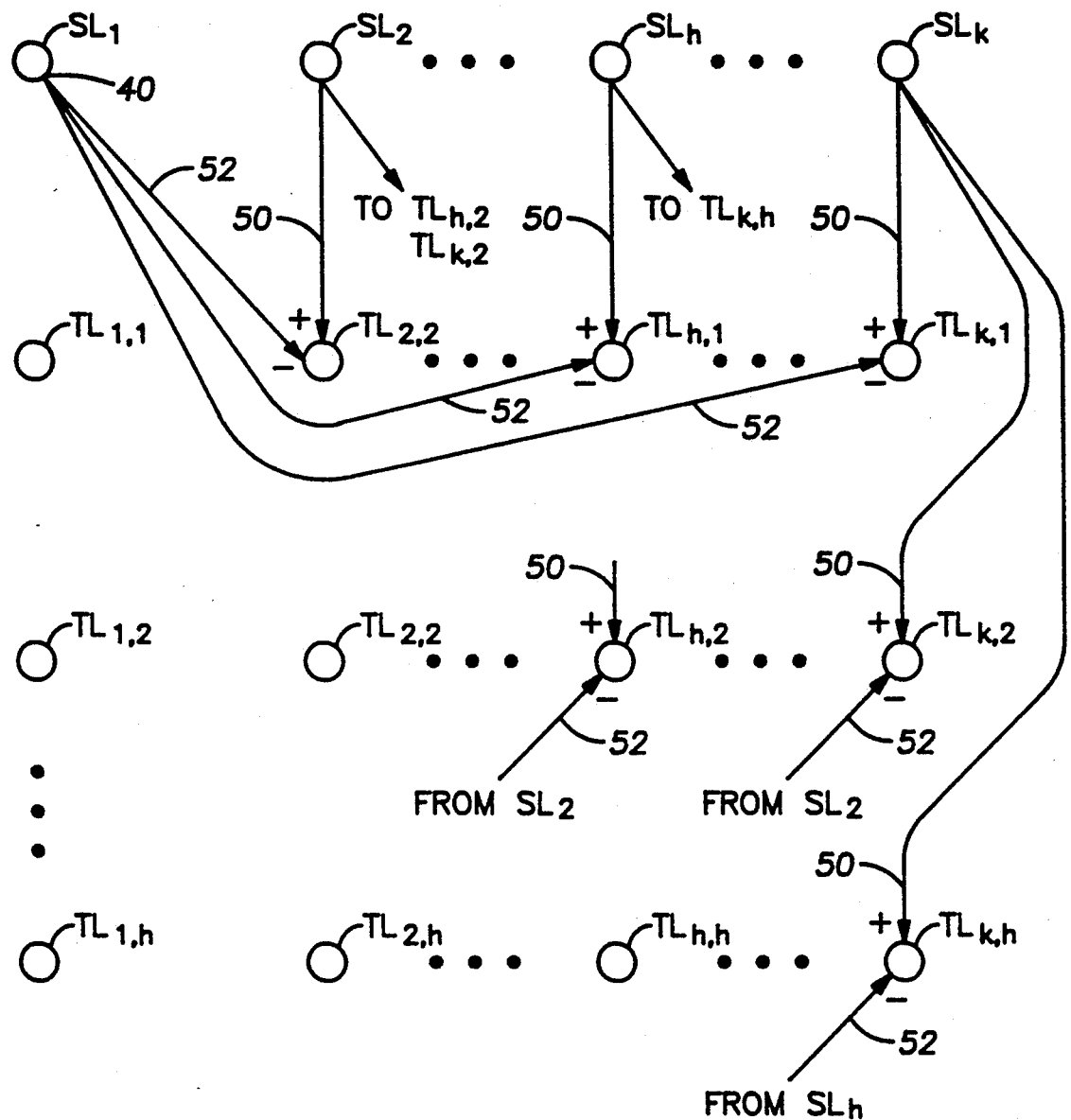

Referring now to FIG. 4, third-layer neuron processors $TL_{k,h}$, where $k = 1$ to $n$, $h = 1$ to $m$ and $n > m$, are arranged in a two dimensional matrix of n columns and m rows (n,m). Each third-layer neuron processor has an excitatory input 50 connected to the output of the second-layer neuron located at a position corresponding to the third-layer neuron column position and an inhibitory input 52 connected to the output of the second-layer neuron located at a position corresponding to the third-layer neuron row position. As illustrated in FIG. 4, each second-layer neuron output may be connected to a plurality of third-layer neuron inputs. As may be noted, only the third-layer neurons whose matrix column number k is greater than row number h are connected to the corresponding position second-layer neurons.

The output of the (k,h) third-layer neuron processor, $TL_{k,h}$, may be represented by:

$$y'''_{kh}(t) = y''_k(t) - y''_h(t) = \begin{cases} 1, & \text{if } 2 > \sum_{i=k-h}^{k} x(t - i\Delta t) > 1 \\ 0, & \text{otherwise} \end{cases}$$

Thus, the third-layer neuron processor located at the k-th column and h-th row receives excitatory input from the k-th second-layer neuron output and inhibitory input from the h-th second-layer neuron output. The (k,h) position third-layer neuron processor indicates interspike intervals within the range of $(k-h)\Delta t$ and $k\Delta t$ when there is an output from the k-th second-layer neuron and an absence of an output from the h-th second-layer neuron.

The system and method of this invention may be used to detect both the exact interspike intervals and intervals with some variance. The interspike interval accuracy and acceptable tolerance may be selected from the topographical location of third-layer neuron processors. Thus, the interspike intervals of the input spike train may be sorted into a distributed set of bandpass filtered spike trains whose topological position within the third-layer neuron processor output matrix indicates the various interspike intervals and their associated bandwidth intervals.

The system of the present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will readily suggest themselves to those skilled in the art and which are encompassed within the spirit of the invention and the scope of the appended claims.

What is claimed is:

1. A neural network interspike interval decoding system for decoding multiplexed pulse-coded signals, embedded serially in a spike train input, into parallel distributed topographically mapped channels, said decoding system comprising a plurality of neurons interconnected to decode the firing interspike-intervals and bandwidth variations of the spike train input, said system comprising:

means for delaying in time the spike train input by a plurality of sequential time intervals where $\Delta t$ represents the duration of time of the time interval and $k\Delta t$ represents the cumulative duration of time of the sequential time intervals for $k=1$ to n, where n is an integer number greater than 1;

means for generating a plurality of sequentially time delayed replicas of the spike train input, wherein the k replica of the spike train input is delayed in time by $k\Delta t$;

a plurality of first-layer neurons in said system, each of said first-layer neurons having a first input adapted to receive the spike train input and having k inputs adapted to receive the sequentially time delayed spike train replicas for $k=1$ to n;

each of said first-layer neurons having an output from which an output pulse of time duration $\Delta t$ is generated when at least two of its inputs receive spikes coincident in time and no previous output pulse has occurred from its output within a time of $(k-1)\Delta t$;

a plurality of first parallel-layer neurons in said system, each of said first-parallel-layer neurons having a first input adapted to receive the spike train input and having k inputs adapted to receive the sequentially time delayed spike train replicas for $k=1$ to n;

each of said first-parallel-layer neurons having an output from which an output pulse of time duration $\Delta t$ is generated when at least three of its inputs receive spikes coincident in time;

a plurality of second-layer neurons in said system, each of said second-layer neurons having excitatory and inhibitory inputs, each second-layer neuron excitatory input connected to a first-layer neuron output and each second-layer neuron inhibitory input connected to a first-parallel-layer neuron output;

each of said second-layer neurons having an output from which an output pulse is generated when a first-layer neuron output pulse is received on its excitatory input and no first-parallel-layer neuron output pulse is received on its inhibitory input;

a plurality of third-layer neurons in said system, each of said third layer neurons having excitatory and inhibitory inputs, said third layer neurons arranged in a matrix having n columns and m rows where n and m are integer numbers and n is an integer number greater than m, wherein the k second-layer neuron output connects to the excitatory input of each of the k column third-layer neurons and the h second-layer neuron output connects to the inhibitory input of each of the h row third-layer neurons, for $k=1$ to n and $h=1$ to m; and each of said third-layer neurons having an output from which an output pulse is generated when a second-layer neuron output pulse is received on its excitatory input and no corresponding second-layer neuron output pulse is received on its inhibitory input.

2. A method for decoding multiplexed pulse-coded signals, embedded serially in a spike train input, into parallel distributed topographically mapped channels using a neural network interspike interval decoding system comprising a plurality of neurons interconnected to decode the firing interspike-intervals and bandwidth variations of the spike train input, said method comprising the steps of:

delaying in time the spike train input by a plurality of sequential time intervals where $\Delta t$ represents the duration of time of the time interval and $k\Delta t$ represents the cumulative duration of time of the sequential time intervals for $k=1$ to n, where n is an integer number greater than 1;

generating a plurality of sequentially time delayed replicas of the spike train input, wherein the k replica of the spike train input is delayed in time by $k\Delta t$;

comparing the spike train input with k time delayed replicas thereof in a plurality of first-layer neurons in said system, each of said first-layer neurons having an output, a first input adapted to receive the spike train input, and having k inputs adapted to receive the sequentially time delayed spike train replicas for $k=1$ to n;

generating a pulse of time duration $\Delta t$ from a first-layer neuron output when at least two of said first-layer neuron inputs receive spikes coincident in time and no previous pulse has occurred from said first-layer neuron output within a time of $(k-1)\Delta t$;

comparing the spike train input with k time delayed replicas thereof in a plurality of first-parallel-layer neurons in said system, each of said first-parallel-layer neurons having an output, a first input adapted to receive the spike train input, and having k inputs adapted to receive the sequentially time delayed spike train replicas for $k=1$ to n;

generating a pulse of time duration $\Delta t$ from a first-parallel-layer neuron output when at least three of said first-parallel-layer neuron inputs receive spikes coincident in time;

comparing pulses from said first-layer neuron outputs with pulses from said first-parallel-layer neuron outputs in a plurality of second-layer neurons in said system, each of said second-layer neurons having an output, and excitatory and inhibitory inputs, each second-layer neuron excitatory input connected to a first-layer neuron output and each second-layer neuron inhibitory input connected to a first-parallel-layer neuron output;

generating a pulse from a second-layer neuron output when a first-layer neuron output pulse is received on said second-layer neuron excitatory input and no first-parallel-layer neuron output pulse is received on said second-layer neuron inhibitory input;

comparing pulses from said second-layer neuron outputs in a plurality of third-layer neurons in said system, each of said third layer neurons having an output, and excitatory and inhibitory inputs, said third layer neurons arranged in a matrix having n columns and m rows where n and m are integer numbers and n is an integer number greater than m, wherein the k second-layer neuron output connects to the excitatory input of each of the k column third-layer neurons and the h second-layer neuron output connects to the inhibitory input of each of the h row third-layer neurons, for k=1 to n and h=1 to m; and generating a pulse from a third-layer neuron output when a second-layer neuron output pulse is received on said third-layer neuron excitatory input and no second-layer neuron output pulse is received on said third-layer neuron inhibitory input.

* * * * *